United States Patent
Puffer et al.

(10) Patent No.: US 7,601,388 B2
(45) Date of Patent: Oct. 13, 2009

(54) METHOD AND APPARATUS FOR TRANSFERRING THIN FILMS FROM A SOURCE POSITION TO A TARGET POSITION

(75) Inventors: Raymond Puffer, Watervliet, NY (US); Stephen Derby, Troy, NY (US); Glenn Saunders, East Greenbush, NY (US); Glen Hoppes, Frankfurt (DE); Louise Courtois, Granby, MA (US); Jürgen Pawlik, Frankfurt (DE); Werner Kraus, Niedernhausen (DE)

(73) Assignee: BASF Fuel Cell GmbH (DE)

( * ) Notice: Subject to any disclaimer, the term of this patent is extended or adjusted under 35 U.S.C. 154(b) by 880 days.

(21) Appl. No.: 10/525,805

(22) PCT Filed: Aug. 20, 2003

(86) PCT No.: PCT/EP03/09201

§ 371 (c)(1),
(2), (4) Date: Jun. 13, 2005

(87) PCT Pub. No.: WO2004/021485

PCT Pub. Date: Mar. 11, 2004

(65) Prior Publication Data

US 2005/0236765 A1 Oct. 27, 2005

(51) Int. Cl.
*H01M 8/04* (2006.01)
*B65H 29/00* (2006.01)
*H01M 8/10* (2006.01)

(52) U.S. Cl. .................................................. 427/115
(58) Field of Classification Search ................. 427/115; 29/623.3–623.5
See application file for complete search history.

(56) References Cited

U.S. PATENT DOCUMENTS

| 4,726,876 | A | * | 2/1988 | Tomsovic, Jr. | ............... 156/552 |
| 4,756,422 | A | | 7/1988 | Kristen | |
| 5,087,025 | A | | 2/1992 | Hamada | |
| RE34,929 | E | | 5/1995 | Kristen | |
| 6,139,004 | A | | 10/2000 | Couillard et al. | |
| 6,165,306 | A | * | 12/2000 | Rajala | ......................... 156/263 |
| 6,187,231 | B1 | | 2/2001 | Sansone et al. | |
| 6,227,541 | B1 | | 5/2001 | Couillard et al. | |

FOREIGN PATENT DOCUMENTS

| EP | 1 130 471 | 9/2001 |
| WO | WO-02/42191 | 5/2002 |

* cited by examiner

*Primary Examiner*—Gregg Cantelmo
(74) *Attorney, Agent, or Firm*—Connolly Bove Lodge & Hutz LLP

(57) ABSTRACT

A method and apparatus for handling thin films, for example, for handling and assembling membranes in fuel cell electrodes. The apparatus includes a translatable vacuum table for mounting the thin film, a perforated drum having a source of vacuum for removing the thin film from the vacuum table, and a transfer assembly having a perforated surface and a source of vacuum for transferring the thin film from the perforated drum to a target location. When the thin films are provided in containers, the apparatus may also include means for opening the containers to access the thin film within. Removal of the thin film from the transfer assembly may be aided by a thin film release device, for example, a plurality of moveable wires. The apparatus may be automated, for example, the apparatus may included automated controllers and robotic arms to facilitate the handling of thin film materials.

3 Claims, 8 Drawing Sheets

METHOD AND APPARATUS FOR TRANSFERRING THIN FILMS FROM A SOURCE POSITION TO A TARGET POSITION

RELATED APPLICATIONS

This application is a national stage application (under 35 U.S.C. 371) of PCT/EP2003/009201 filed Aug. 20, 2003 which claims benefit to U.S. application Ser. No. 10/232,424 filed Aug. 30, 2002.

TECHNICAL FIELD

This invention relates generally to apparatus and methods used for handling thin films, for example, for transferring and positioning thin films into assemblies utilizing the thin films. Specifically, the present invention provides improved methods and apparatus for transferring thin membranes, for example, fuel cell membranes, during the assembly of devices containing membranes, for example, fuel cell membrane-electrode assemblies.

BACKGROUND OF THE INVENTION

Thin film-like materials are handled in many different types of industries, for example, in photographic and x-ray film manufacture and processing, membrane manufacture and processing, packaging, printing, and electronics, among others. The thin, flexible, and often fragile nature of film-like materials typically requires special considerations when handling these materials, for example, to prevent tearing, distortion, and breakage, and to ensure proper orientation and alignment during assembly.

One field in which the handling of thin film-like materials is often problematic is the field of fuel cell membranes, for example, during the handling and assembly of fuel cell membranes into Membrane Electrode Units (or MEUs). A critical step in the process of assembling an MEU is the removal of the membrane from the container in which it is received from the membrane manufacture. Fuel cell membranes are typically provided in plastic bags, for example, polyethylene (PE) or polyester (PET) bags, and are maintained in an acidic environment, for example, the membranes are typically conditioned in a viscous acidic fluid for example, viscous solution of phosphoric acid. The membranes are typically removed from these bags and positioned, for example, under close tolerances, for instance, within about 0.003 inches, onto target electrode assemblies without excessive wrinkling or distortion of the membrane. This removal from the container and positioning on the electrode is typically hampered by the following factors: 1) the membrane material is typically very thin (for example, approximately 30 100 microns in thickness); 2) the membrane is typically conditioned in a viscous solution of phosphoric acid and water, that is, typically an 85% solution of phosphoric acid and water; 3) the conditioned membrane material becomes very soft, slippery, and easy to distort; and 4) the membrane typically grows in all dimensions by approximately 20% during conditioning, necessitating cutting of the membrane after it has been conditioned.

Typically, according to the existing art, the handling and processing of fuel cell membranes is performed manually. In addition to the worker safety issues associated with frequent exposure to the conditioning acid, the tasks become more difficult as the size of the membrane increases. For example, for larger size membranes, for instance those handled in the assembly of MEUs, at least two workers are required to handle the membrane and place it smoothly on, for example, a target electrode. This is a very time-consuming task. In addition, because the conditioned membrane is highly hydrophilic the membrane must be sealed between the electrodes within a short period of time after being removed from its plastic bag. Due to economic, safety and other reasons, there is a need in the art to provide automated means for handling fuel cell membranes.

SUMMARY OF THE INVENTION

The present invention provides methods and apparatus which address many of the limitations of prior art methods and apparatus. One aspect of the present invention is a method for transferring a thin film from a source position to a target position, the method comprising: positioning the thin film in the source position; attaching the thin film to a first surface in a first position; moving the first surface from the first position to a second position wherein the thin film is removed from the source position; transferring the thin film from the first surface to a second surface, the second surface positioned in a first position; moving the second surface from the first position to a second position; and transferring the thin film from the second surface to the target position. In one aspect of the invention, the thin film is provided in a container having a top and wherein the method further comprises cutting the top of the container to provide access to the thin film. In another aspect of the invention, cutting the top of the container further comprises cutting the thin film.

In another aspect of the invention, the source position comprises a translatable position wherein attaching the thin film to a first surface further comprises translating the source position. In one aspect of the invention, the first surface comprises a perforated first surface operatively connected to a source of vacuum and wherein attaching the thin film to the first surface comprises exposing the thin film to the source of vacuum via the perforated first surface. In another aspect of the invention, the first surface comprises an arcuate surface, for example, a perforated drum, and wherein moving the first surface comprises rotating the arcuate surface. In anther aspect of the invention, the second surface comprises a thin film release mechanism and wherein transferring the thin film from the second surface to the target position comprises activating the thin film release mechanism. The thin film may comprise a membrane, for example, a fuel cell membrane, provided in a viscous acidic solution.

Another aspect of the invention is an apparatus for transferring a thin film from a source position to a target position, the apparatus comprising: means for transferring the thin film from the source position to a first surface in a first position; means for moving the first surface wherein the thin film is transferred to a second position; means for transferring the thin film from the first surface to a second surface, the second surface in a first position; means for moving the second surface from the first position to a second position; and means for transferring the thin film from the second surface to the target position. In one aspect of the invention, the thin film is provided in a container having a top and wherein the apparatus further comprises means for cutting the top of the container to provide access to the thin film. In one aspect of the invention, the means for cutting the top of the container comprises a die cutter having at least one metallic blade.

In another aspect of the invention, the source position comprises a translatable surface, for example, a translatable vacuum table. In one aspect of the invention, the first surface comprises an arcuate surface, for example, perforated drum, and wherein the means for moving the first surface comprises means for rotating the drum. In one aspect of the invention, the second surface comprises a perforated second surface and wherein the means for transferring the thin film from the second position to the second surface comprises a source of vacuum operatively connected to the perforated second surface. In one aspect of the invention, the thin film is a membrane, for example, a fuel cell membrane provided in a viscous acidic solution.

A further aspect of the invention is a method for feeding a fuel cell membrane to a fuel cell electrode, the method comprising: positioning the fuel cell membrane onto a vacuum table; attaching the fuel cell membrane to an arcuate surface in a first position; rotating the arcuate surface from the first position to a second position wherein the fuel cell membrane is removed from the vacuum table; transferring the fuel cell membrane from the arcuate surface to a transfer surface, the transfer surface positioned in a first position; moving the transfer surface having the fuel cell membrane from the first position to a second position adjacent a fuel cell electrode; and transferring the fuel cell membrane from the transfer surface to the fuel cell electrode.

A further aspect of the invention is an apparatus for removing a fuel cell membrane from a container and feeding the fuel cell membrane to a fuel cell electrode, the apparatus comprising: a vacuum table for accepting the container containing a fuel cell membrane, the container having a top; a die cutter for cutting the top of the container; a rotatable drum having a perforated outer surface; vacuum means for drawing at least part of the fuel cell membrane from the container and on to the perforated outer surface of the rotatable drum; means for rotating the rotatable drum wherein the fuel cell membrane is transferred from the vacuum table to the rotatable drum; a perforated surface operatively connected to a source of vacuum for drawing the fuel cell membrane from the rotatable drum to the perforated surface; means for positioning the perforated surface bearing the fuel cell membrane adjacent the fuel cell electrode; and means for transferring the fuel cell membrane from the perforated surface to the fuel cell electrode.

A further aspect of the invention is a thin film handling device comprising: a perforated surface upon which the thin film is mounted; a plenum communicating with at least some of the perforations in the surface; a vacuum operatively connected to the plenum; and a means for moving the perforated surface. In one aspect of the invention, the perforated surface is an arcuate surface mounted for rotation and the means for moving the arcuate surface comprises means for rotating the arcuate surface. In one aspect of the invention, the perforated arcuate surface comprises a cylindrical drum. In one aspect of the invention, the interior of the cylindrical drum provides the plenum to which the vacuum is connected. In another aspect of the invention, the perforated surface is a planar surface. In another aspect of the invention, the device, having either a planar or an arcuate surface, further includes means for dislodging the thin film from the surface. For example, the means for dislodging the thin film from the surface may be hydraulic means, pneumatic means, or mechanical means. For instance, in one aspect of the invention, the mechanical means for dislodging the thin film may be a plurality of wires extending across the surface and moveable relative to the surface. In another aspect of the invention, the pneumatic means of dislodging the thin film from the surface may comprise means for pressurizing the plenum, for example, for a limited duration, to dislodge the thin film from the surface. In one aspect of the invention, the thin film comprises a membrane, for example, a fuel-cell membrane, but any type of thin film may be handled by the invention.

A still further aspect of the invention is a method for handling thin films comprising: providing a perforated surface in a first position; providing a source of vacuum operatively connected to perforated surface; mounting the thin film on the perforated surface by means of the source of vacuum; and moving the surface from the first position to a second position. The surface may be a planar or arcuate surface, for example, the arcuate surface may be the outer surface of a cylindrical drum. In one aspect of the invention, moving the surface may comprise translating the surface in one or more directions or rotating the surface. The method may further comprise dislodging the thin film from the surface, for, example, hydraulicly, pneumatically, or mechanically dislodging the thin film from the surface. The method may comprise a method for handling membranes, for example, fuel-cell membranes, but the method may be used to handle any type of thin film.

A further aspect of the invention is a method for handling a thin film, the thin film provided in a container having a top and a bottom, the method comprising: providing a first perforated surface, the first perforated surface provided with a source of vacuum; mounting the container with the thin film on the perforated surface by means of the source of vacuum; severing the top of the container wherein the top of the container can be displaced; displacing the top of the container; providing a second perforated surface, the second perforated surface provided with a source of vacuum; and transferring the thin film from the first perforated surface to the second perforated surface. In one aspect of the invention, the displacing the top of the container from the container comprises one of manually displacing the top of the container and automatedly displacing the top of the container. In another aspect of the invention, displacing the top of the container comprises removing the top of the container. In one aspect of the invention, the method further comprises moving the second perforated surface having the thin film to a target location. As in the aspects above, this method may be a method for handling fuel-cell membranes.

These and other embodiments and aspects of the present invention as well as their advantages compared to the prior art will become more apparent upon review of the attached drawings, description below, and attached claims.

BRIEF DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following detailed descriptions of the preferred embodiments and the accompanying drawings in which:

DETAILED DESCRIPTION OF THE PREFERRED EMBODIMENTS

Figure 1:
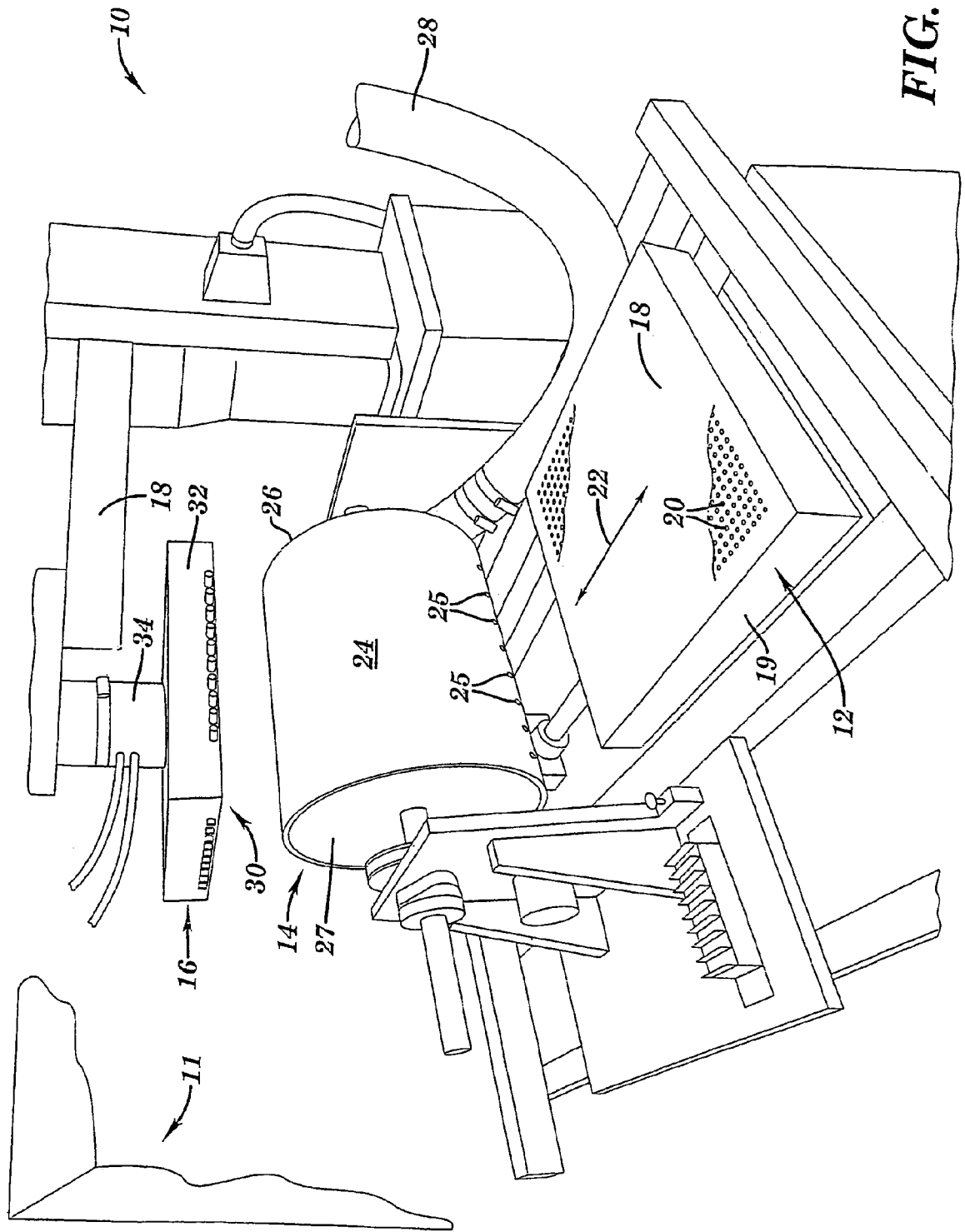
FIG. 1 is a perspective view of a thin-film handling system according to one aspect of the present invention.

FIG. 1 illustrates a perspective view of a thin-film handling system 10 according to one aspect of the present invention. Though thin film-like materials having a broad range of thicknesses may be handled by the present invention, the materials handled by the present invention may have a thickness that ranges from about 1 micrometer (about 0.00004 inches) to about 1 millimeter (about 0.040 inches) and typically may have a thickness that ranges from about 25 micrometers (about 0.001 inches) to about 500 micrometers (about 0.020 inches). In one aspect of the invention, the material handled by the present invention may have a thickness between about 50 micrometers (about 0.002 inches) and about 200 micrometers (about 0.008 inches).

Figure 2:
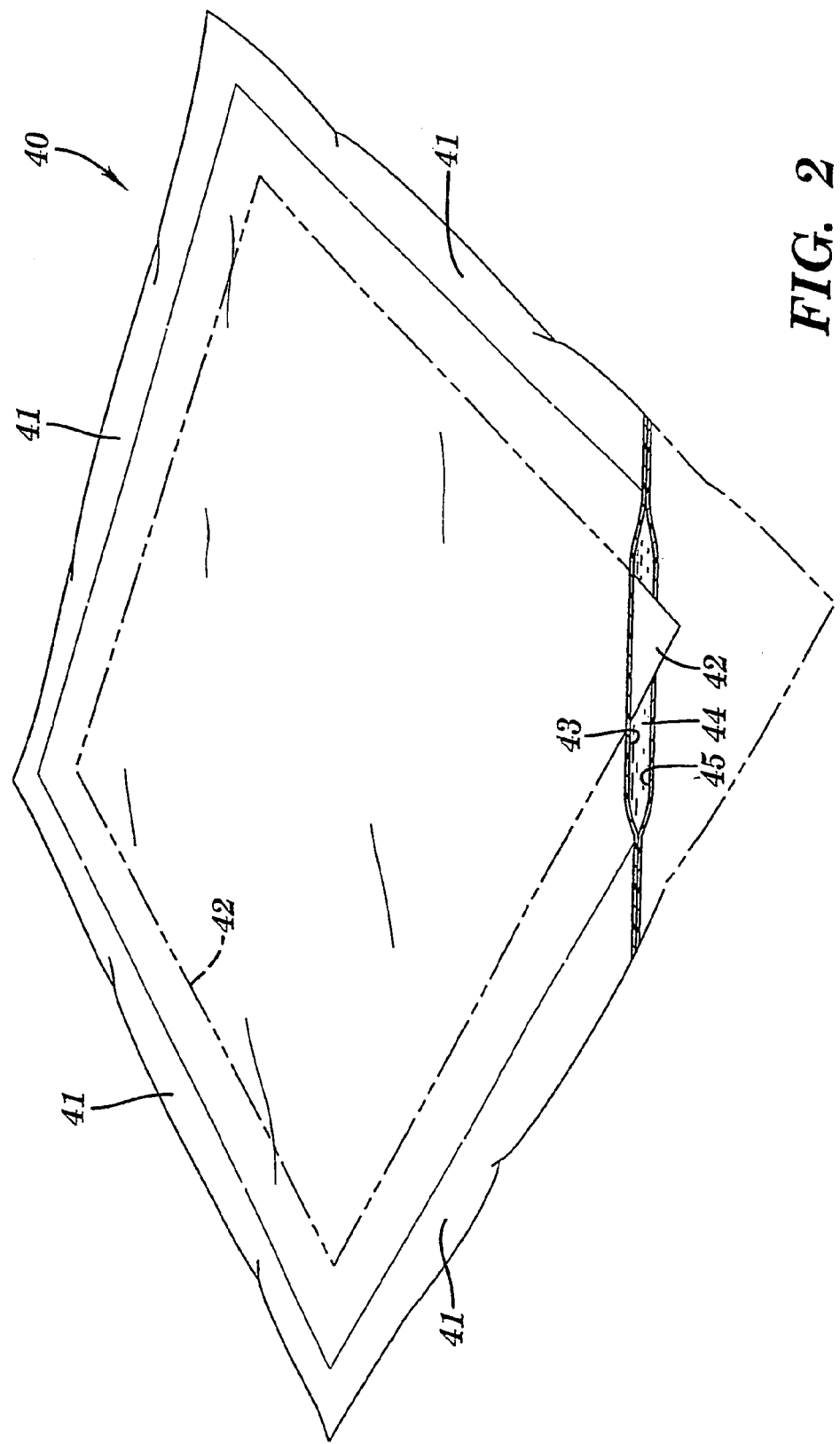
FIG. 2 is a perspective view of a membrane storage container that can be handled using handling system shown in FIG. 1 according to one aspect of the invention.

Handling system 10 includes a film mounting table assembly 12, for example, a vacuum table assembly, a film transfer drum assembly 14, and a film transfer plate assembly 16. In one aspect of the invention, a thin film may be transferred from mounting table assembly 12 to transfer plate assembly 16 via transfer drum assembly 14; however, in another aspect of the invention, a thin film may be manually transferred from mounting table assembly 12 to transfer plate assembly 16. System 10 may be enclosed in an enclosure 11, for example, an enclosure in which the temperature, pressure, and humidity are controlled. A typical thin film that is handled by system 10 is shown in FIG. 2, but is not shown in FIG. 1. Mounting table assembly 12 typically includes at least one thin film mounting table 18, for example, a vacuum table having a plurality of apertures 20 and a plenum 19 operatively connected to a source of vacuum (not shown). Mounting table 18, in one aspect of the invention, is slidably mounted wherein it is translatable, that is, it is moveable in one or more directions. In the aspect of the invention shown in FIG. 1, mounting table 18 is moveable in the direction shown by double arrow 22. Mounting table assembly 12 is disclosed in more detail in FIG. 3.

In FIG. 1, transfer drum assembly 14 comprises an arcuate surface 24 for retaining and transferring a thin film from mounting table assembly 12 to transfer plate assembly 16. Though in FIG. 1 arcuate surface 24 is a complete cylindrical drum 26, in one aspect of the invention, arcuate surface 24 may be less than 360 degrees in circumference, for example, an arcuate surface having an arcuate length less than about 180 degrees or even less than about 90 degrees. In one aspect of the invention, surface 24 includes holes or perforations 25 and the inside of drum 26 provides a plenum 27 which is operatively connected to a source of vacuum, for example, via conduit 28. Perforations 25 are typically evenly distributed across surface 24. Though a single row of perforations 25 is shown in FIG. 1, surface 24 may include 2 or more rows of perforations 25. The presence of a vacuum on the inside of drum 26 and the perforations 25 provides one means of retaining the thin film on the surface 24. Further aspects of transfer drum assembly 14 according to the present invention are disclosed in detail in FIG. 5.

Also with reference to FIG. 1, film transfer plate assembly 16, which is also known as a vacuum chuck, according to one aspect of the present invention comprises a surface 30, for example, a flat surface, for transferring a thin film from the transfer drum assembly 14 to a target location (not shown). For example, in one aspect of the invention, a target location for the thin film is a fuel cell membrane electrode assembly, though according to other aspects of the present invention, other types of targets may be used depending upon the type of thin film being handled. As will be shown more clearly later, in one aspect of the invention, surface 30 is perforated and transfer plate assembly 16 includes a plenum 32 operatively connected to a source of vacuum, for example, via support and conduit 34. Transfer plate assembly 16 is typically mounted upon an automated position controller or robotic arm 18, for example, a robotic arm of a SCARA-type robotic arm, such as, an Adept Cobra 600 robotic arm, or its equivalent. Further aspects of transfer plate assembly 16 according to the present invention are disclosed in detail in FIGS. 6, 7, and 8.

One type of thin film that may be handled by system 10 shown in FIG. 1 is shown in FIG. 2. FIG. 2 illustrates a perspective view of a membrane storage container 40 having one or more membranes 42, for example, one or more fuel cell membranes, for example, the polybenzimidazole (PBI) film produced by the process disclosed in U.S. Pat. No. 6,187,231 [assigned to Celanese Ventures GmbH] or its equivalent. In one aspect of the invention, container 40 is a plastic bag, for example, a polyethylene (PE) plastic bag, for instance, a high-density polyethylene (HDPE) or a low-density polyethylene (LDPE) plastic bag, or a polyester (PET) plastic bag. Container 40 typically includes one or more sealed edges 41 and an upper inside surface 43 and a lower inside surface 45. In one aspect of the invention, container 40 is a plastic bag described in U.S. Pat. No. 4,756,422 (reissued as U.S. Reissued Pat. RE34,929) and marketed under the trademark VacLoc FoodSaver bag by the company Tillia, Inc., San Francisco, Calif. In one aspect of the invention, container 40 contains a viscous fluid 44, for example, an acidic solution that conditions membrane 42, for instance, the acidic solution may contain phosphoric acid or its equivalents. Viscous fluid 44 typically has a viscosity of at least about 1.0 centipoise (cp), and in one aspect of the invention, the viscosity of the fluid is between about 20 cp and about 70 cp, for example, a viscosity of about 28 cp at a temperature of about 20 degrees C.

In one aspect of the invention, the inner surfaces 43, 45 of container 40 exhibit "preferential sticking", that is, one surface provides a greater adherence to thin film 42 than the other surface. For example, when transferring thin film 42 from one surface to another surface, in some aspects of the invention, it is preferred that thin film 42 be easily released from one inner surface 43, 45 of container 40 while being retained by the other surface 43, 45. For instance, during transfer from mounting table 18 to arcuate surface 24 of drum assembly 14, according to one aspect of the invention, thin film 42 preferably adheres more strongly to top inner surface 43 and is transferred with top surface 43 to the arcuate surface 24 while lower inner surface 45 readily releases thin film 42 allowing thin film 42 to transfer to arcuate surface 24 while lower inner surface 45 is retained on mounting table 18. Preferential sticking may be provided by differences in surface texture, for example, one surface may provide a textured surface and the other surface may provide a relatively smooth surface. Preferential sticking may also be provided by different materials, for example, different polymers; surface treatment or different surface treatment, for example, etching, coating, burnishing, and the like; among other means. In one aspect of the invention, the preferential sticking is a function of the pH, viscosity, or chemistry of the viscous fluid 44 contained in container 40.

Figure 3:
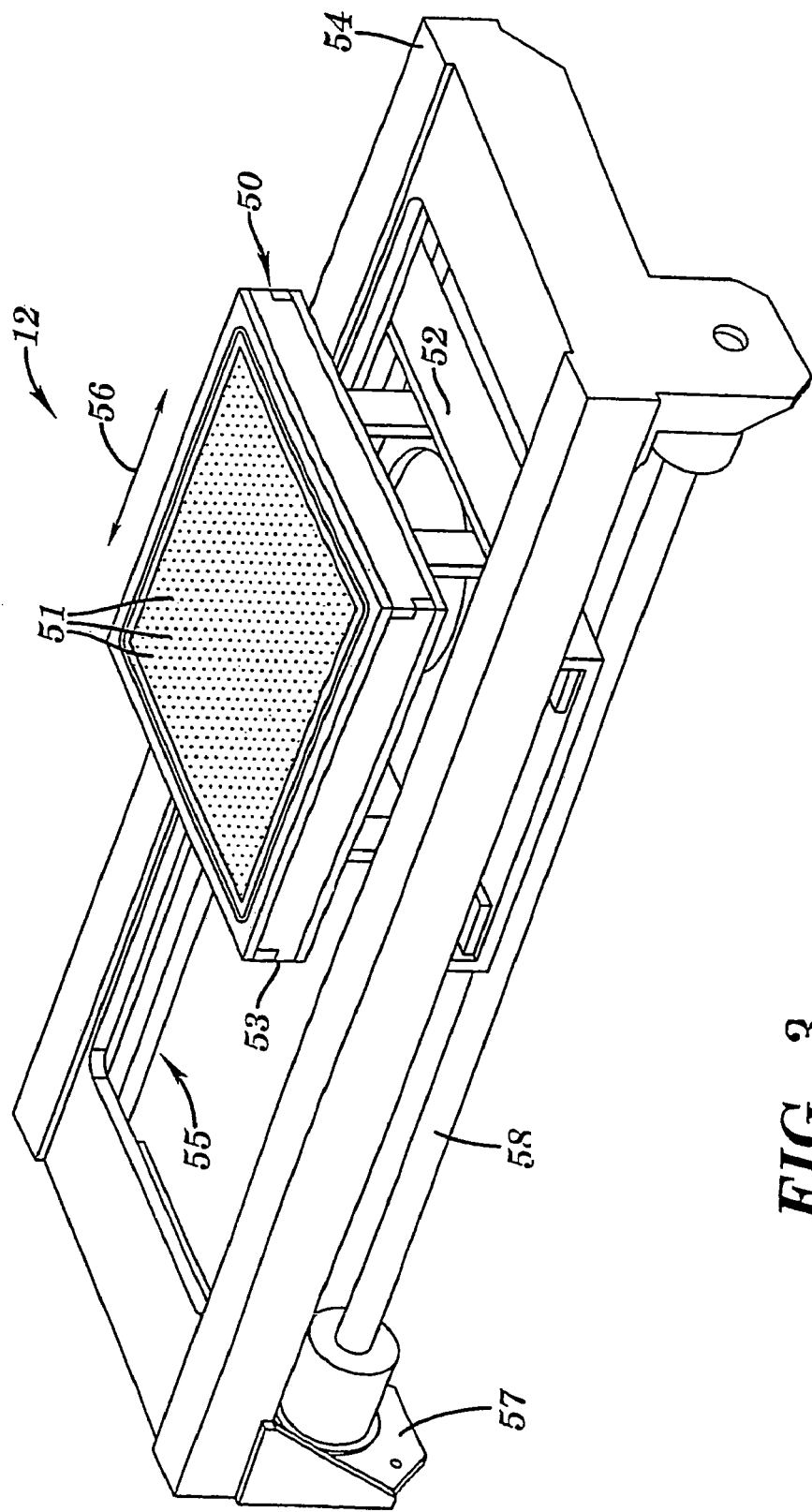
FIG. 3 is a perspective view of the vacuum table assembly of the thin-film handling system shown in FIG. 1 according to one aspect of the invention.

FIG. 3 illustrates a perspective view of the mounting table assembly 12 shown in FIG. 1 for mounting thin films to be handled by system 10 in FIG. 1. The thin films mounted on mounting table assembly 12, may be in a sealed container, such as container 40 shown in FIG. 2, or its equivalent, or the thin film may not be stored in a container but laid directly on to mounting table assembly 12. In one aspect of the invention, the thin film or its container may be mounted manually on mounting table assembly 12; in another aspect of the invention, mounting may be automated.

As shown in FIG. 3, in one aspect of the invention, mounting table assembly 12 includes a vacuum table 50 having a plurality of perforations 51 and a plenum or manifold 53. Perforations 51 are typically distributed about surface 24, for example, evenly distributed, though, in one aspect of the invention, perforations 51 may be randomly distributed about the surface of vacuum table 50. In one aspect of the invention, the spacing, location, and size of perforations 51 are customized to the size and weight of the container being handled by table 50 (for example, container 40 in FIG. 2). In one aspect of the invention, perforations 51 are circular perforations, but perforations 51 may assume any shape including smooth shapes, such as oval or ellipsoidal, and polygonal shapes, such as triangular, square, quadrilateral, and pentagonal, among others. Perforations 51 may vary in size from about 0.04 inches to about 0.25 inches. Perforations 51 may comprise a single row or multiple rows of perforations, for example, evenly-spaced or non-evenly-spaced perforations. The perforations 51 in the multiple rows may be aligned, uniformly staggered, non-uniformly staggered, or randomly distributed. Perforations 51 may also be randomly distributed about the surface of vacuum table 50 or may be equally distributed, for example, equally spaced about the surface of vacuum table 50. In one aspect of the invention, perforations 51 are about 1/8 of an inch (about 3.175 mm) in diameter and are equally spaced on about 0.75 inch (about 19.05 mm) centers in both the longitudinal and transverse directions. In one aspect of the invention, one or more perforations 51 may be masked to limit the amount of area of the container exposed to vacuum and thus limit the "gripping" force on the container. In one aspect of the invention, the size and location of perforations 51 are defined to minimize or prevent perforations 51 from interfering with the cutting blades during die cutting of the container positioned on vacuum table 50, for example, to minimize or prevent perforations 51 from interfering with the cutting blades 64 of die cutter assembly 60 shown in FIGS. 4A and 4B.

Plenum 53 is typically operatively connected to a source of vacuum (not shown). In one aspect of the invention, vacuum table 50 is supported by a support structure 52 which in turn is slidably mounted on a frame 54. The vacuum in plenum 53 retains the thin film on vacuum table 50 and minimizes the undesirable movement of the thin film, for example, unwanted lateral movement of the thin film or the thin film container during the handling or separation process. In addition, in one aspect of the invention, the vacuum in plenum 53 ensures that the bottom layer of a container remains in place as the top layer of the container and the thin film, for example, membrane, are "peeled off" of the bottom of the container.

Support structure 52 is typically mounted to frame 54 by means of low friction bearings 55, for example, ball or roller bearings or low-friction bearing surfaces. In one aspect of the invention, support structure 52 is slidably mounted to frame 54 by low friction bearings 55, for example, recirculating-ball-type linear bearings mounted for translation on precision-ground shafts. One such bearing mounting that can be used for the present invention is a bearing arrangement referred to as a "Thompson slide".

In one aspect of the invention, vacuum table 50 is translatable, for example, capable of reciprocating motion in the direction of double arrow 56. The movement of vacuum table 50 may be automated, for example, in one aspect of the invention, the movement of vacuum table 50 is controlled by a motor, for example, a stepper motor or a servo-motor, and appropriate controls and one or more drive means. In one aspect of the invention shown in FIG. 3, the movement of vacuum table 50 is controlled by a stepper motor (not shown) mounted to motor mount 57. The motor may be coupled to a drive means, for example, a drive means comprising one or more ball screws 58, though in other aspects of the invention other types of drive mechanisms may be used. In one aspect of the invention, an encoder (not shown) may be used on the drive motor shaft or drive means to provide position feedback to a motion controller (not shown), for example, an Adept motion controller.

According to one aspect of the invention, handling system 10 shown in FIG. 1 is used to handle thin films, for example, membranes and the like, which are provided in sealed containers or bags, for example, container 40 shown in FIG. 2. In one aspect of the present invention, the container holding the thin film contains an acidic solution. In order to handle such thin films, the container holding the then film is typically severed, cut, or otherwise opened to allow access to the thin film inside. In addition, some types of membranes being handled according to the present invention, for example, fuel-cell-type membranes, "grow" approximately 20% to 25% during conditioning in the acid-filled bag. In order to insure that the thin film is of the desired size, the thin film is cut to size after it has been conditioned. Typically, this may be the only way that the thin film, for example, the membrane, maintains its desired size.

In one aspect of the invention, any conventional means of opening the container holding the thin film may be used. The container may be cut by hand or through automated means.

Figure 4A:
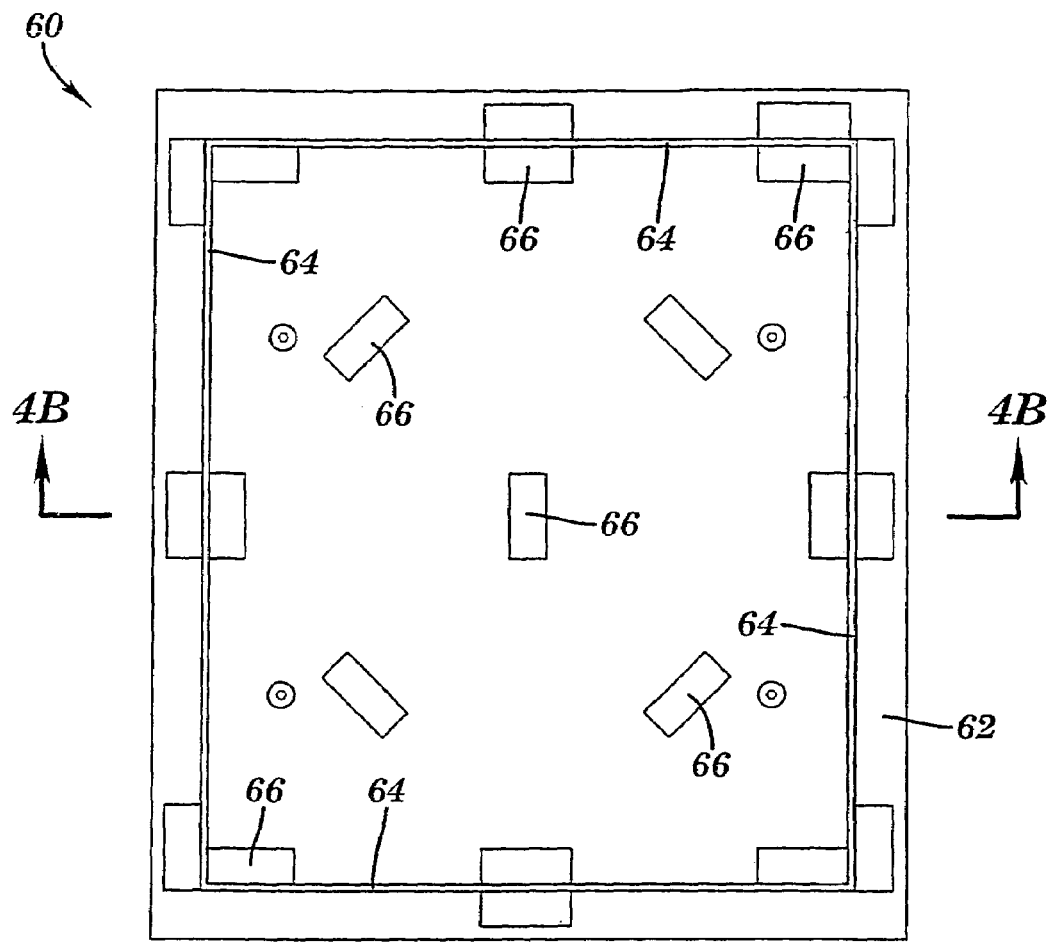
FIGS. 4A and 4B illustrate a top view and a cross-sectional view, respectively, of a die cutter according to one aspect of the present invention.
Figure 4B:
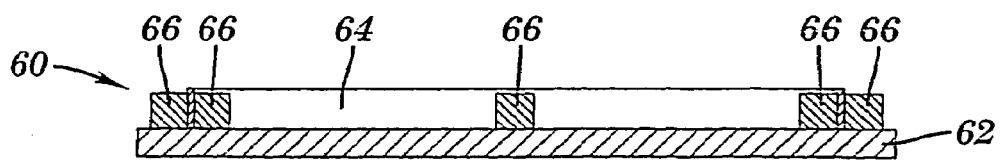

In another aspect of the invention, the container holding the thin film is opened and the thin filmed accessed by means of a die cutter assembly 60, shown in FIGS. 4A and 4B. FIG. 4B is a cross sectional view of die cutter 60 taken through the view lines 4B-4B shown in FIG. 4A. In one aspect of the invention, die cutter 60 includes a support block 62, for example, a wooden support block 62, and at least one metallic cutting blades 64 mounted in the support block 62. According to one aspect of the invention, die cutter 60 is positioned over a thin film container, for example, container 40 in FIG. 2, and compressed against the container to sever at least part of the container. The at least one metallic cutting blades are preferably acid resistant, for example, in one aspect of the invention, metallic cutting blades 64 may be titanium cutting blades or stainless steel cutting blades, for example, ASTM 304 or 316 stainless steel cutting blades, or their equivalents. In another aspect of the invention, the one or more metallic cutting blades 64 may also be a hardened steel, such as S-7 hardened steel, which may be coated with an acid resistant coating, for example, a titanium nitride coating. In one aspect of the invention, one or more cutting blades 64 may be machined from a solid block of material, for example, electro-discharged machined (EDM), laser cut, or water-jet cut from a stainless steel (for example, 310 or 316 stainless steel), titanium, or hardened steel (such as S-7 hardened steel treated with an acid-resistant coating). In one aspect of the invention, one or more cutting blades 64 may be machined from a solid block of material wherein the remaining material provides support block 62, that is, cutting blades 64 and support block 62 may be fabricated as a single integral part. In one aspect of the invention, die cutter assembly 60 includes a plurality of resilient blocks 66, for example, rubber blocks, that are used to insure that the thin film and or container are ejected from the die cutter assembly 60 following cutting. In one aspect of the invention, resilient blocks 66 comprise one or more resilient sheets or boards, that may partially cover or entirely cover the surface of support block 62.

In one aspect of the invention, die cutter assembly 60 is mounted on a means for compressing the die cutter assembly 60 against a surface, for example, a hydraulic press. The means for compressing the die cutter assembly 60 may comprise means for compressing die cutter assembly 60 upon a container containing a thin film, for example, a membrane.

In one aspect of the invention, die cutter assembly 60 is positionable, for example, by manual or automated means. In one aspect of the invention, die cutter 60 is positionable over a container holding a thin film, such as container 40 in FIG. 2, for example, while container 40 is positioned on mounting table assembly 12 (see FIG. 1). For example, in one aspect of the invention, die cutter assembly 60 is positionable by means of an automated controller and a hydraulic press. In another aspect of the invention, die cutter assembly 60 is positioned and compressed upon a container holding a thin film before it is placed on mounting table 12.

In one aspect of the invention, at least one cutting blade 64 severs only the top cover of the container holding the thin film while leaving the thin film and bottom cover of the container essentially intact. In another aspect of the invention, at least one cutting blade 64 severs the top cover of the container and the thin film within the container, that is, to effect a "kiss cut", and the bottom cover of the container remains essentially intact. In another aspect of the invention, at least one cutting blade 64 severs the top cover of the container, the thin film within the container, and the bottom cover of the container, that is, all sides of the container and its contents are severed. In another aspect of the invention, at least three cutting blades 64 are used in die cutter assembly 60, for example, a leading edge and two sides edges of container 40 are severed. In another aspect of the invention, at least four cutting blades 64 are used in die cutter assembly 60.

Figure 5:
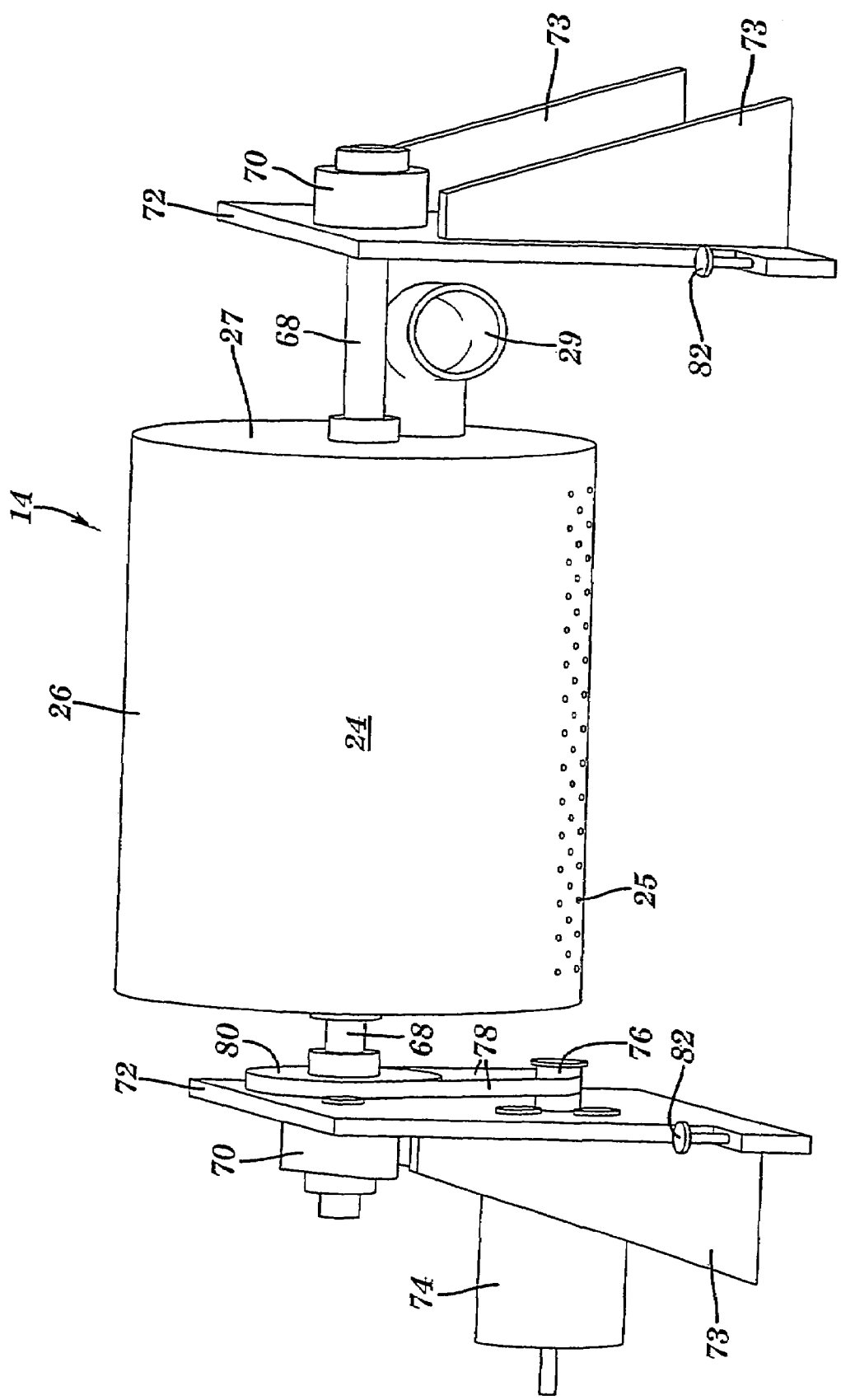
FIG. 5 is a perspective view of the transfer drum assembly of the thin-film handling system shown in FIG. 1 according to one aspect of the invention.

FIG. 5 illustrates a perspective view of the transfer drum assembly 14 shown in FIG. 1. Transfer drum assembly 14 is used to peel the thin film, or the top of the container and the thin film, from the mounting table assembly 12 and transfer the thin film to a location where the thin film can be transferred to transfer plate assembly 16. As noted with respect to FIG. 1, transfer drum assembly 14 typically comprises an arcuate surface 24. Though in FIG. 5 arcuate surface 24 is a complete cylindrical drum 26, in one aspect of the invention, arcuate surface 24 may be less than 360 degrees in circumference. For example, surface 24 may comprise the surface of a segment of a cylinder, or some other curved surface, for example, a non-cylindrical curved surface, may be used. In one aspect of the invention, surface 24 includes holes or perforations 25, for example, one or more rows of perforations 25, and the inside of drum 26 provides a plenum or manifold 27 which is operatively connected to a source of vacuum, for example, via vacuum inlet 29. In one aspect of the invention, the source of vacuum is operatively connected to plenum 27 via a hollow drive shaft, for example, shaft 68 discussed below and appropriate rotary seals. The source of vacuum typically provides between about 0.1 kilopascals (kPa) (about 0.03 inches of Hg) to about 33.8 kPa (about 10 inches of Hg) of vacuum in plenum 27. The level of vacuum provided in plenum 27 may be monitored and regulated to control the gripping force applied to the thin film materials being handled.

Perforations 25 are typically distributed about surface 24, for example, evenly distributed, though, in one aspect of the invention, perforations 25 may be randomly distributed about surface 24. In one aspect of the invention, the spacing, location, and size of perforations 25 are customized to the size and weight of the material being handled. In one aspect of the invention, as shown in FIG. 5, perforations 25 are circular perforations, but perforations 25 may assume any shape, including smooth shapes, such as oval or ellipsoidal, and polygonal shapes, such as triangular, square, quadrilateral, and pentagonal, among others. Perforations 25 may vary in size from about 0.04 inches to about 0.125 inches. Perforations 25 may comprise a single row or multiple rows of perforations, for example, evenly-spaced or non-evenly-spaced perforations. The perforations 25 in the multiple rows may be aligned, uniformly staggered, non-uniformly staggered, or randomly distributed. Perforations 25 may also be randomly distributed about surface 24 or may be equally axially-spaced or equally circumferentially spaced, or both. In one aspect of the invention, perforations 25 are about ⅛ of an inch (about 3.175 mm) in diameter and are equally axially spaced on about 1.125 inch (about 28.575 mm) centers and equally circumferentially spaced on about ½ inch (about 12.7 mm) centers. In one aspect of the invention, the leading edge of perforations 25 on surface 24 (that is, the perforations nearest table 12 by which the surface 24 first "grasps" the thin film on table 12) may have a different pattern of perforations than the remainder of the perforated surface 24 of drum 26. For example, the leading edge of perforations 25 may have a higher density of holes, for example, a large open area, than the remainder of the perforations. These perforations 25 positioned toward the leading edge may be of uniform size and distribution or of non-uniform or varying size and distribution. In one aspect of the invention, perforations 25 along the leading edge are about ⅛ inch (about 3.175 mm) in diameter and are spaced on ¼ inch (6.35 mm) centers, that is, more closely spaced than the perforations described above and thus providing more open area than the perforations discussed above. Those of skill in the art will recognize that many hole sizing and spacings may be used to effect the desired transfer of the thin film.

In one aspect of the invention, drum 26 is rigidly mounted to drive shaft 68 which is mounted for rotation in bearings 70 which are supported by support plates 72 having, for example, one or more gussets 73. Support plates 72 may be mounted by means of adjusting screws 82 to allow for adjustment of the standoff distance between vacuum table 50 and drum 26 to account for differences in the thickness and flatness of the thin film material being handled. Transfer drum assembly 14 may also be mounted on translatable mounts, for example, bearings or rollers, wherein transfer drum assembly 14 may be positionable, either manually or automatedly, in assembly 10, for example, by means of automated controllers and positioning means.

Though many conventional drive means may be used to rotate drum 26, in one aspect of the invention, drum 26 is driven by motor 74, for example, a stepper motor, having a drive sheave 76 which drives a belt 78, for example, a v-belt or timing belt. Belt 78 rotates sheave 80 mounted on shaft 68 to rotate drum 26. In one aspect of the invention, the drive means reciprocally rotates drum 26; in another aspect, the drive means rotates drum 26 in one direction. According to other aspects of the invention, drum 26 may be driven by any other conventional drive means, including and not limited to, a direct drive motor, chains and sprockets, gears, etc., among others means.

According to one aspect of the invention, the speed of drum 26 is monitored and controlled to allow drum 26 to be rotated in approximate synchronization with the lateral movement of vacuum table 50 and transfer plate assembly 16. In one aspect of the invention, an encoder (not shown) is located on the shaft of drive motor 74 and the encoder is used to provide position feedback of speed or orientation of drum 26 to a motion controller (not shown).

According to one aspect of the invention, the rotational velocity of drum 26 relative to the speed of vacuum table 50 optimizes the thin film transfer process by controlling the positional accuracy of the transfer. The controlling of the thin film transfer helps minimize wrinkling or other distortion of the thin film as it is being transferred from the vacuum table 50 to drum 26 and from drum 26 to transfer plate assembly 16. In one aspect of the invention, drum 26 initially rotates so that the drum surface 24 moves at essentially the same speed as vacuum table 50. This insures that the thin film material is securely held by drum 26 and the thin film material achieves an initial separation from vacuum table 50. In another aspect of the invention, as drum 26 and vacuum table 50 continue to move, the speed of drum 26 is increased slightly (for example, at least about 1% to about 100%) compared to the speed of vacuum table 50 to allow the thin film material to be transferred under a slight tension, thereby minimizing any wrinkles or other distortion in or damage to the thin film material during transfer. For example, in one aspect of the invention, the table 50 travels at a linear speed of about 1 inch per second and drum 26 rotates at about 10 degrees per second, which (for the size of the drum 26 used) corresponds to a tangential velocity of drum 26 of about 1.87 inches per second. In this aspect of the invention, the speed of drum 26 is about 87% faster than the speed of table 50.

Figure 6:
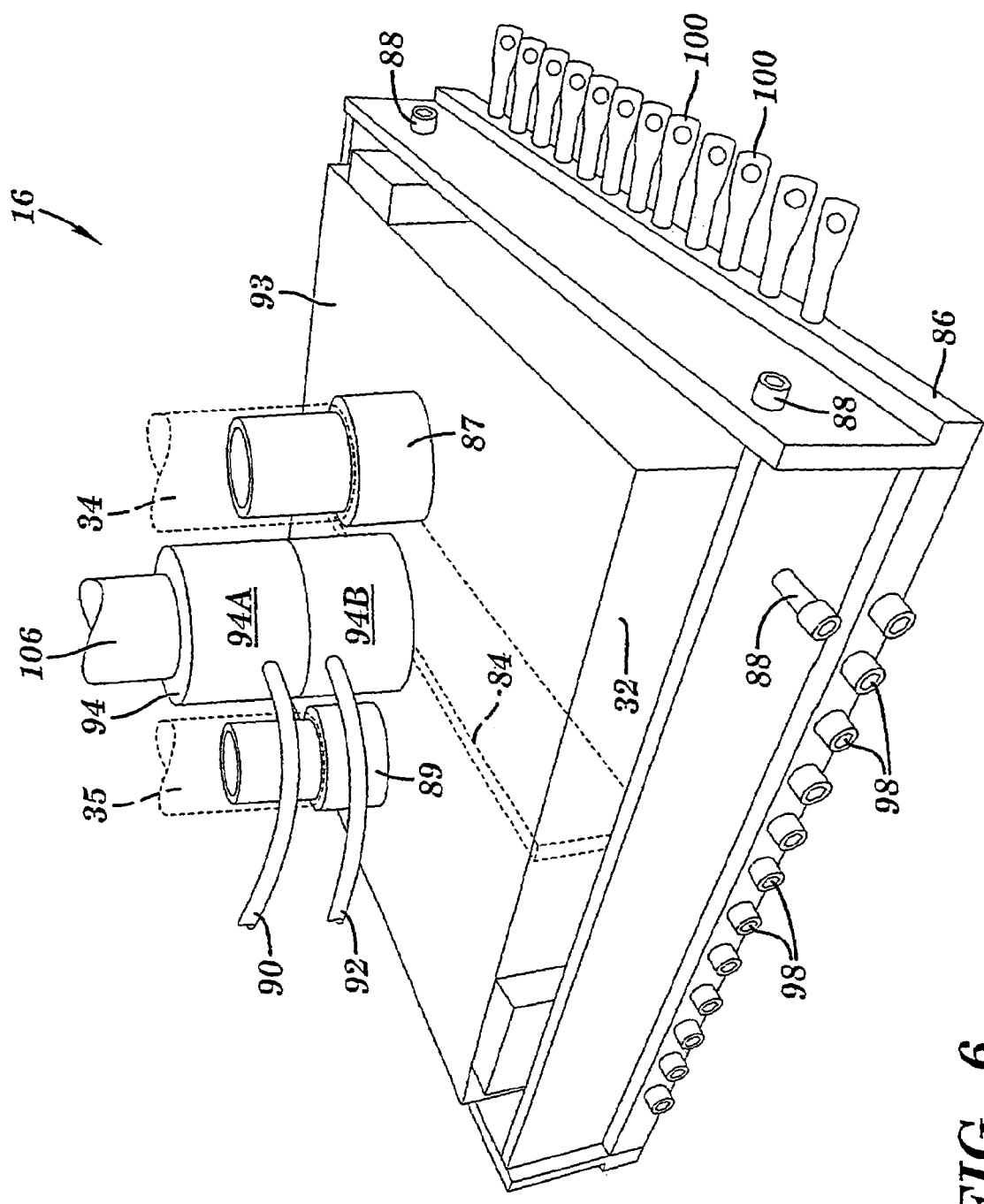
FIG. 6 is top perspective view of the transfer plate assembly of the thin-film handling system shown in FIG. 1 according to one aspect of the invention.
Figure 7A:
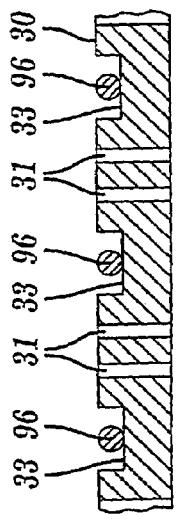
FIG. 7A is a detailed view of one leading edge hole pattern of the transfer plate assembly of FIG. 7 according to one aspect of the present invention.
Figure 7B:
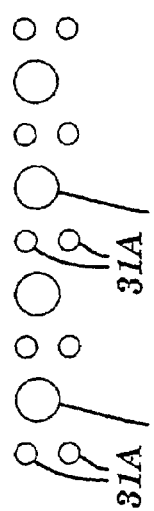
FIG. 7B is a detailed cross-sectional view of the perforated surface shown in FIG. 7 according to one aspect of the present invention.
Figure 7:
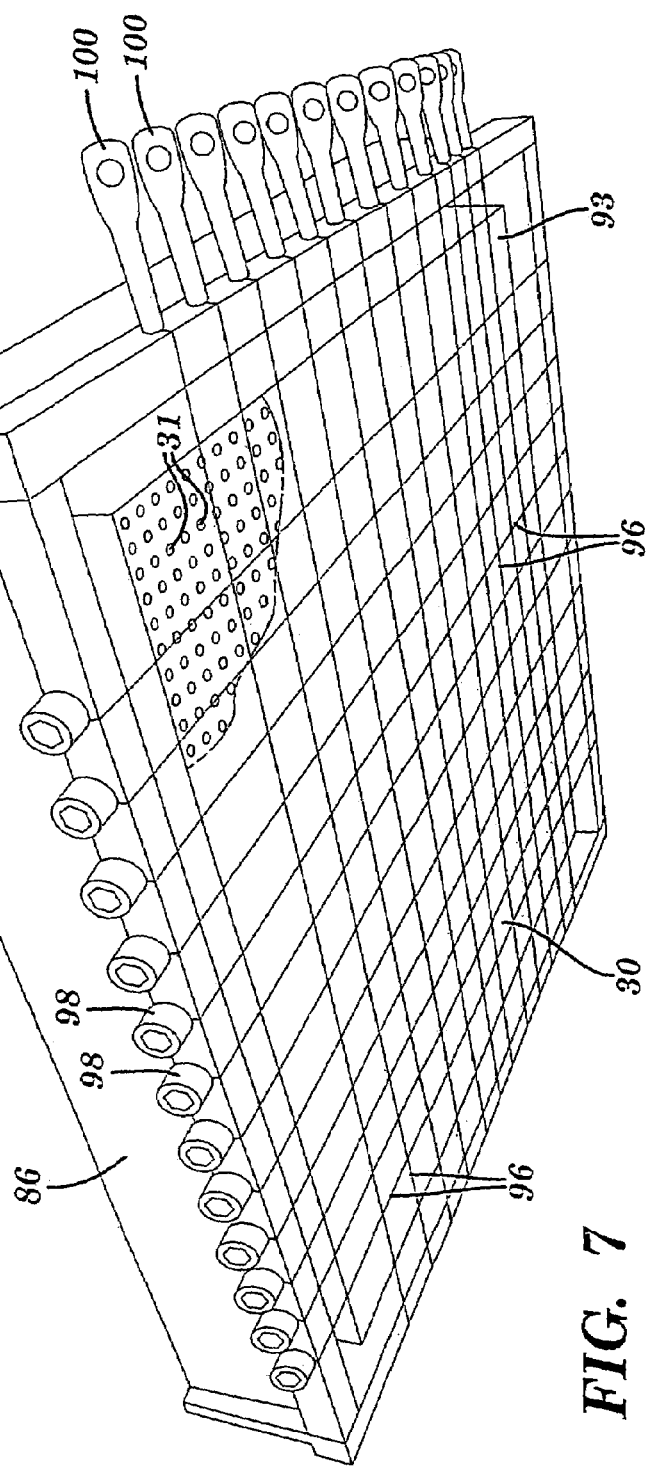
FIG. 7 is bottom perspective view of the transfer plate assembly of the thin-film handling system shown in FIG. 1 according to one aspect of the invention.

FIG. 6 illustrates a top perspective view of the transfer plate assembly 16 shown in FIG. 1. FIG. 7 illustrates a bottom perspective view of transfer plate assembly 16 shown in FIG. 1. Transfer plate assembly 16 is also referred to as the "vacuum chuck assembly". As noted with respect to FIG. 1, according to one aspect of the present invention, transfer plate assembly 16 is used to remove a thin film material, for example, a membrane, from the transfer drum 26 and transfer the thin film material to a target location (not shown), for example, to an assembly into which a membrane is to be installed. In one aspect of the invention, in which the thin film material is stored in a container, for example, a plastic bag 40 shown in FIG. 2, transfer plate assembly 16 is used to remove the thin film material from transfer drum 26 while leaving one layer of the container on transfer drum 26. In this aspect of the invention, the layer of the container is held onto the surface 24 of transfer drum 26 by vacuum.

As most clearly shown in FIG. 7, transfer plate assembly 16 includes at least one surface 30, for example, a horizontal flat surface, having a plurality of holes, perforations, or apertures 31. The number, size, and location of holes 31 in surface 30 may be varied or adjusted to accommodate different sizes and shapes of thin films, for example, different shapes of membranes. Holes 31 are typically distributed about surface 30, for example, evenly distributed, though, in one aspect of the invention, holes 31 may be randomly distributed about surface 30. In one aspect of the invention, the spacing, location, and size of holes 31 are customized to the size and weight of the material being handled. In one aspect of the invention, as shown in FIG. 7, holes 31 are circular holes, but holes 31 may assume any shape, including smooth shapes, such as oval or ellipsoidal, and polygonal shapes, such as triangular, square, quadrilateral, and pentagonal, among others. Holes 31 may vary in size from about 0.04 inches (about 1 mm) to about 0.125 inches (3.125 mm). Holes 31, similar to perforations 25, may comprise a single row or multiple rows of perforations, for example, evenly-spaced or non-evenly-spaced perforations. Holes 31 in the multiple rows may be aligned, uniformly staggered, non-uniformly staggered, or randomly distributed. Holes 31 may also be randomly distributed about surface 30 or may be equally spaced on surface 30. In a typical aspect of the invention, holes 31 are about 0.051 inches (about 1.29 mm) in diameter and are equally spaced on about ½ inch (about 12.7 mm) centers in rows equally spaced on about ½ inch (about 12.7 mm) centers. In one aspect of the invention, the leading edge of holes 31 on surface 30 (that is, the holes nearest drum 26 by which the surface 30 first "grasps" the thin film on drum 26) may have a different pattern of holes than the remainder of the pattern of holes in surface 30 of transfer plate assembly 16. For example, the leading edge of perforations 31 may have a higher density of holes, for example, a large open area, than the remainder of the holes. These holes 31 positioned toward the leading edge may be of uniform size and distribution or of non-uniform or varying size and distribution. According to one aspect of the invention, holes 31 along the leading edge of surface 30 may comprise one or more rows of larger holes. According to another aspect of the invention, holes 31 along the leading edge of surface 30 may comprise staggered rows of holes of varying diameter. For example, in one aspect of the invention shown in FIG. 7A the one or more rows of larger holes along the leading edge of surface 30 may comprise rows of smaller holes 31A alternating with larger holes 31B. For example, holes 31A may have a diameter of about 0.04 inches (about 1 mm) and holes 31B may have a diameter of about 0.06 inches (about 1.5 mm). In this aspect of the invention, holes 31A may be equally-spaced on ⅛ inch centers (about 3.127 mm), for example, in the vertical direction shown in FIG. 7A, and equally-spaced on about ¼ inch (about 6.254 mm) centers, for example, in the horizontal direction of FIG. 7A. Large holes 31B may be equally-spaced on about ¼ inch (about 6.254 mm) centers. Holes 31A and 31B may also be unequally spaced.

Figure 8:
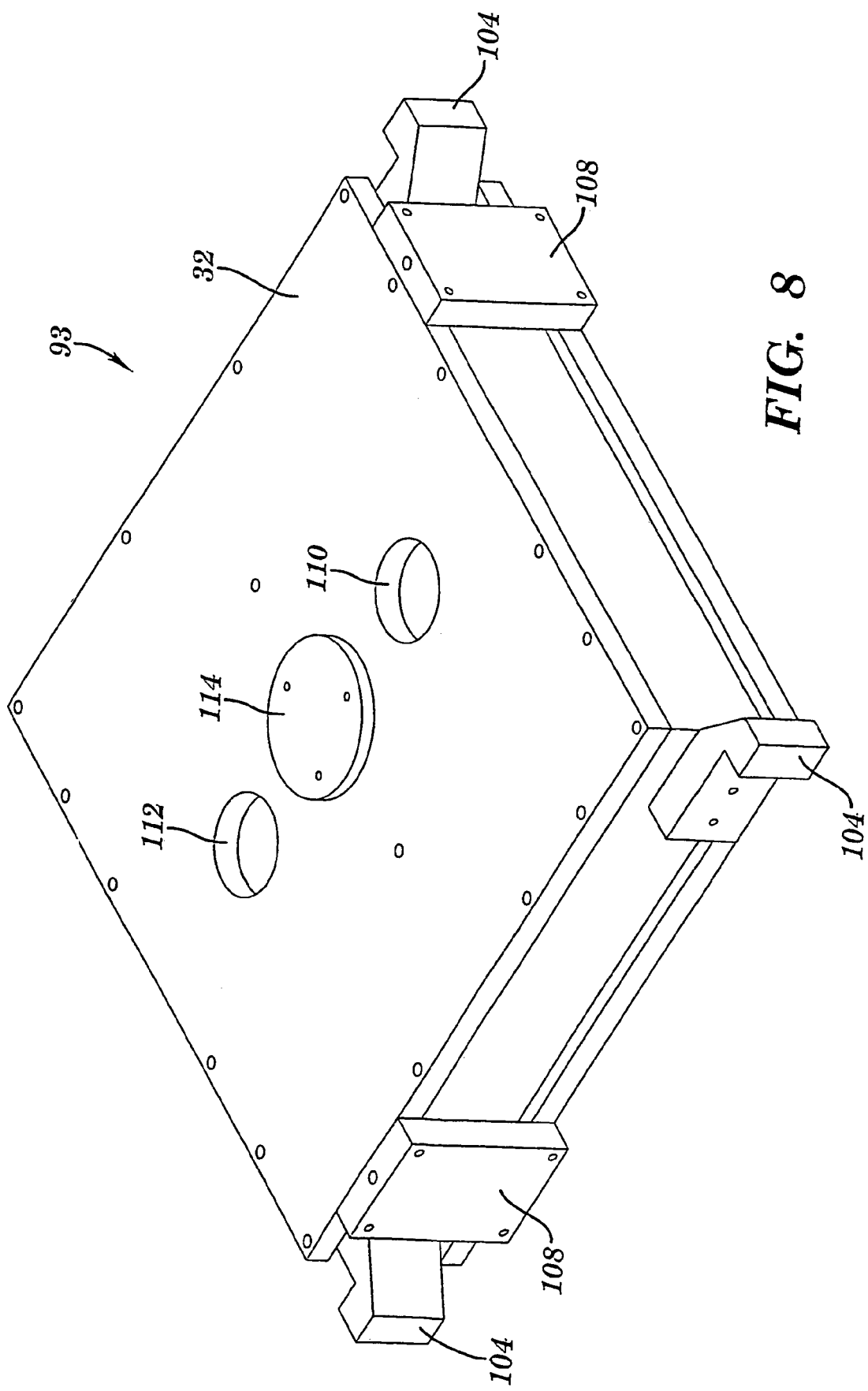
FIG. 8 is perspective view of the vacuum plate assembly shown in FIGS. 6 and 7 according to one aspect of the invention.

Surface 30 may be made from a metallic, or non-metallic material, for example, a transparent plastic material such as polycarbonate, polypropylene, polyethylene, or like materials. As most clearly shown in FIG. 6, transfer plate assembly 16 also includes a vacuum plate assembly 93 having a manifold or plenum 32. A perspective view of vacuum plate assembly 93 is shown in FIG. 8. Plenum 32 is operatively connected to a source of vacuum (not shown), for example, via hoses or conduits 34 and 35 connected to vacuum connectors 87, 89, respectively. The source of vacuum typically provides between about 0.1 kPa (about 0.03 inches of Hg) to about 33.8 KPa (about 10 inches of Hg) in plenum 32. The level of vacuum provided in plenum 32 may be monitored and regulated to control the gripping force applied to the thin film materials being handled. Holes or apertures or perforations 31 penetrate surface 30 and are exposed to the vacuum in plenum 32. According to one aspect of the present invention, thin films are retained on surface 30 by means of a vacuum drawn through holes 31. Transfer plate assembly 16 may also include one or more air hoses 34, 35, or a separate hose (not shown) for providing a flow of pressurized gas, for example, pressurized air at a pressure between about 0 psig and about 90 psig, to plenum 32. Transfer plate assembly 16 may also include a coupling 94, for example, a quick-disconnect coupling having mating connectors 94A and 94B, for connecting and detaching transfer plate assembly 16 from support 106, for example, for mounting to a robotic arm (not shown). When mounting adapter 94 comprises a pneumatically controlled quick-disconnect coupling, the coupling may be actuated by mean of pressurized air introduced via hoses 90, 92 to actuate connectors 94A and 94B, respectively. According to one aspect to the invention, thin films are detached from surface 30 by a flow of pressurized gas from plenum 32 through holes 31. The pressurized gas supply and vacuum may be monitored and regulated by means of appropriate pressure and flow control means (not shown), for example, pressure gages or pressure taps and flow valves and valve controllers.

With reference to FIG. 6, plenum 32 of vacuum plate assembly 93 may be made from a metallic or non-metallic material, for example, a transparent plastic material such as polycarbonate, polypropylene, polyethylene, or like materials. Plenum 32 may include one or more internal baffles 84 to isolate different regions of plenum 32, for example, to isolate regions operatively connected to the source of vacuum provided by conduits 34 and 35, or further conduits (not shown). For example, in one aspect of the invention, vacuum plate assembly 93 comprises multiple, separate plenums (for example, 2 or more plenums, or 4 or more plenums) at least some of which may be provided with a source of vacuum or pressurized gas. The flow of pressurized gas to or the exposure to vacuum of the individual plenums may be individually controlled and monitored to provide flexibility in retaining and deflecting thin films from perforated surface 30. In the aspect of the invention shown in FIGS. 6 and 7, vacuum plate 93 is mounted in support frame 86, for example, a metallic or non-metallic support frame 86. Support frame 86 provides a mounting for wires 96 (discussed below with respect to FIG. 7). Support frame 86 deflects (that is, translates) relative to vacuum plate 93 and, in one aspect of the invention, movement of support from 86 may be guided by vacuum plate 93, for example, guided by the sides of vacuum plate 93. Support frame 86 may include a plurality of threaded fasteners 88, for example, hex-head cap screws. Threaded fasteners 88 may be used to retain support frame 86 (and wires 96) in a retracted or raised position relative to vacuum plate 93.

As shown in FIG. 6, in one aspect of the invention, transfer plate assembly 16 having vacuum plate 93 may be mounted to robotic arm 18 (see FIG. 1) or other positioning system by means of mounting adapter 94. Mounting adapter 94 may be attached to an automated position controller or a robotic arm 18 (see FIG. 1), for example, a robotic arm of a SCARA-type robotic arm, such as, an Adept Cobra 600 robotic arm, or its equivalent. According to one aspect of the invention, arm 18 is used to position transfer plate assembly 16 at least adjacent to transfer drum 26 and then adjacent to a target location (not shown), for example, an assembly onto which the thin film is to be placed. In one aspect of the invention, machine vision is used to accurately guide the robot arm 18 to place the thin film on the target location. In one aspect of the invention, the positioning of transfer plate assembly 16 is effected manually.

As shown most clearly in FIG. 7, in one aspect of the invention, transfer plate assembly 16 includes a plurality of wires 96 which extend across surface 30 and assist in the removal of the thin film from surface 30 of vacuum plate assembly 93. Wires 96 are typically metallic wires, for example, wires made from 304 or 316 stainless steel and have a diameter of between about 0.010 inches (about 0.25 mm) and about 0.125 inches (about 3.175 mm). Wires 96 typically extend across support frame 86 and are retained by conventional mechanical fasteners 98, 100, for example, cap screws. Wires 96 may be interlaced or woven to provide as uniformly planer wire interface as possible. In one aspect of the invention, fasteners 100 are adjustable tensioning screws used to vary the tension in wires 96, for example, in one aspect of the invention, wires 96 are retained at one end by socket-head cap screws 98 and at the other end by adjustable tensioning screws 100. In one aspect of the invention, as shown in FIG. 7B, surface 30 may include shallow grooves or recesses 33 into which wires 96 are imbedded or retracted below the surface 30 to ensure contact between the thin film and surface 30. Grooves or recesses 33 may be equally spaced from holes 31 and have depths and widths at least equal to or slightly greater than the diameter of the wires 96. This ensures that wires 96 are recessed below surface 30, for example, are not exposed above surface 30 to contact the thin film. The recesses or grooves 33 in surface 30 may be fashioned in a criss-crossing grid patterned, for example, machined into surface 30.

In one aspect of the invention, when the transfer plate assembly 16, having a thin film (not shown) on surface 30 (for example, held by means of vacuum) is positioned above the desired location, the vacuum is reduced or shut off and the thin film is allowed to fall under the force of gravity into the desired location. If the surface tension between the thin film and surface 30 (for example, due to the presence of a viscous liquid in which the thin film is immersed) is too strong to overcome gravity stream of gas, for example, a low pressure, high volume stream of gas (typically air), may be applied to the vacuum plate assembly 93, for example via hoses 34, 35 to dislodge the thin film from surface 30. (Though in one aspect of the invention hoses 34, 35 provide both pressurized gas and vacuum, in another aspect of the invention, pressurized gas and vacuum may be provided by separate hoses.) However, as a further aid in releasing the thin film from surface 30, surface 30 may be moveable relative to wires 96 to force the thin film from surface 30. In one aspect of the invention, vacuum plate assembly 93 is moveable relative to support frame 86 and means are provided for deflecting vacuum plate assembly 93 relative to support frame 86, or vice versa, to dislodge the thin film from surface 30. For example, as the vacuum plate assembly 93 having surface 30 is deflected from support frame 86 having wires 96, the thin film is more easily separated from wires 96 by gravity, since there is typically insufficient surface contact area between wires 96 and the thin film to allow the thin film to adhere to wires 96.

According to one aspect of the invention support frame 86 having wires 96 may be deflected relative to vacuum plate assembly 93 by means of some form of manual, electrical, mechanical, or electromechanical means, for example, hydraulically, pneumatically, or magnetically. In one aspect of the invention, the deflection of support frame 86 is effected electro-mechanically by solenoid-controlled rods, also known as "shot pins". The deflection of support frame 86 relative to vacuum plate 93 may be effected by some form of cam or detent, for example, a spring-loaded detent, which limits the range of deflection of frame 86 or plate 93. The deflection of support frame 86 may also be limited by a mechanical stops.

As shown in FIG. 8, stops 104 on vacuum plate assembly 93 may limit how far the vacuum, plate 93 can be displaced relative to support frame 86. In one aspect of the invention, about 0.25 inches to about 0.50 inches of relative displacement between vacuum plate assembly 93 and support frame 86 is provided. As shown in FIG. 8, vacuum plate assembly 93 may include locating pin blocks 108 which cooperate with removable pins or threaded fasteners (not shown) to allow for easy registration of the vacuum plate assembly 93 with the target location.

As also shown in FIG. 8, vacuum plate assembly 93 typically includes at least one vacuum port 110 and 112 into which vacuum connectors 87 and 89 (see FIG. 6) can be inserted. Vacuum plate assembly 93 also typically includes some form of support mounting 114 for attaching mounting adapter 94 (see FIG. 6) to vacuum plate 93. For example, mounting support 114 may be suitable mounting for a pneumatically operated quick disconnect actuated by pressurized air (typically, about 70 to about 90 psig) supplied via hoses 90, 92.

According to one aspect of the invention, thin films, for example, the thin film 42 shown in FIG. 2, may be handled in the following fashion. First, though thin film 42 may be removed from container 40 (for example, plastic bag 40) prior to placing film 42 onto surface 18 of vacuum table assembly 12, in one aspect of the invention, bag 40 containing thin film 42 is placed on table assembly 12 without being opened or cut. Either prior to placing bag 40 onto surface 18 or soon thereafter, a source of vacuum to table assembly 12 is activated to produce a vacuum in plenum 19 whereby bag 40 is retained on surface 18. Bag 40 may be opened manually or by positioning and compressing die cutter 60 (see FIGS. 4A and 4B) onto bag 40. As described above, in one aspect of the invention, the four blades 64 of die cutter 60 may effect a "kiss cut" wherein the top of bag 40 and thin film 42 are severed by blades 64, but the bottom of bag 40 is not severed by blades 64. Die cutter 60 may be positioned and compressed manually or by means of automated actuators, for example, by means of an automatic controller and, for example, a hydraulic press.

In one aspect of the invention, top of bag 40 may be removed from table assembly 12 manually, that is, by an operator, and thin film 42 can be picked up from table assembly 12 by transfer plate assembly 16 and transferred by transfer plate assembly 16 to a desired location. However, in another aspect of the invention, the top of bag 40 and thin film 42 may be removed from table assembly 12 and transferred to transfer plate assembly 16 by means of transfer drum assembly 14. In this aspect of the invention, after removing die cutter 60 from bag 40, surface 18 having severed bag 40 is then moved, for example, by manual or automated means, toward transfer drum assembly 14, for example, as indicated by double arrow 22 in FIG. 1. Prior to or at the same time as bag 40 on table assembly 12 approaches the surface 24 of drum 26, the source of vacuum to plenum 27 is activated, and a vacuum is drawn through holes 25 in surface 24. According to the present invention, when bag 40 is positioned adjacent to holes 25, sufficient vacuum is drawn through holes 25 wherein at least the leading edge of the top of bag 40 and the leading edge of thin film 42 are drawn to and retained onto surface 24. In one aspect of the invention, the mounting of drum 26 may not be fixed, but may allow for at least some deflection of drum 26, for example, vertical deflection, whereby surface 24 is moved, for example, momentarily, closer to the top of bag 40 to facilitate retention of the top of bag 40 and thin film 42 on surface 24. Drum 26 is then rotated, for example, in clock-wise direction as viewed from the right-hand side of drum 26 in FIG. 1. According to this aspect of the invention, the speed and direction of rotation of drum 26 and the speed and direction of translation of table assembly 12 are such (for example, in the same direction, though they may move in opposite directions) that the rotation of drum 26 "peels" the top of bag 40 and thin film 42 away from table assembly 12 while the bottom of bag 40 is retained on table assembly 12. The retention of the thin film 42 on drum 26 may be aided by adhesion between the top of bag 40 and thin film 42 due to surface tension. This surface tension may be enhanced by the presence of a viscous fluid, for example, the viscous fluid in which thin film 42 may be treated. As noted earlier, this peeling of the top of bag 40 and thin film 42 away from the bottom of bag 40 may be facilitated by the preferential sticking of thin film 42 to the top of bag 40. This preferential sticking may be effected by one or more of the means discussed above.

The rotation of drum 26 and the translation of table assembly 12 is continued until the top of bag 40 and film 42 are removed from table assembly 12. Upon removal of bag 40 and film 42, table assembly 12 may be returned to its original source or mounting position and, after removal of the waste bag material, await acceptance of the next bag 40 and thin film 42. The waste bag material may be removed from table assembly 12 manually or by automated means.

According to the present invention, the rotation of drum 26 is continued until the position of the top of bag 40 and film 42 approaches transfer plate assembly 16. The rotation of drum 26 may continue in the same direction (for example, clockwise as viewed from the right side of FIG. 1) as when film 42 is removed from table assembly 12, or in the opposite direction. For example, drum 26 may be rotated in a reciprocating fashion wherein the drum "rocks" back and forth when transferring film 42 from table assembly 12 to transfer table assembly 16.

Prior to or just when bag 40 and film 42 approach transfer table assembly 16, a source of vacuum is introduced to plenum 32 of transfer table assemble 16. The vacuum in plenum 32 draws a vacuum through perforations 31 (see FIG. 7) wherein thin film 42 is drawn to and attached to surface 30 of transfer table assembly 16. According to the invention, the vacuum maintained in plenum 27 of drum 26 and the vacuum drawn in plenum 32 of transfer table assembly 16 are sufficient so that thin film 42 is drawn to and attached to surface 30, but the top of bag 40 is retained on surface 24 of drum 26. Though In one aspect of the invention drum 26 and surface 30 are stationary during the transfer of thin film 42, in another aspect of the invention, the removal of thin film 42 from surface 24 may be effected while surfaces 24 and 30 are in motion, or when either surface 24 or surface 30 is in motion. For example, the location of transfer table assembly 16 may be controlled whereby the leading edge of thin film 42 is grasped by surface 30 as drum 26 is moving and the leading edge of thin film 42 approaches surface 30. When both drum 26 and transfer table assembly 12 are in motion during transfer of thin film 42 to surface 30, the direction of motion of drum 26 and surface 30 is typically the same, though the surfaces may move in opposite directions. When surface 30 includes wires 96 (see FIG. 7) for releasing thin film 42, wires 96 are typically retracted to avoid hindering transfer of film 42 to surface 30. After thin film 42 is removed from surface 24, drum 26 may be rotated back into position and, after removal of the waste bag material, positioned to accept and retain the next thin film. Again, the waste bag material may be removed from drum 26 manually or by automated means.

According to the invention, after thin film 42 is retained on the surface 30 of transfer table assembly 16, transfer table assembly 16 may be moved and positioned over the target location, for example, positioned over an electrode assembly. The movement of transfer table assembly 16 may be effected manually or by means of automated controllers, for example, by means of robotic arm 18 (see FIG. 1). As noted above, the positioning of transfer table assembly 16 may be aided by the use of machine vision and appropriate positioning software.

Upon proper positioning of thin film 42 over its target position, the vacuum in plenum 32 may be reduced or eliminated wherein thin film 42 may fall under the force of gravity into place on the target position. If the force of gravity is insufficient to dislodge thin film 42, displacement of thin film 42 from surface 30 may be encouraged by introducing pressurized air (or other gases, such as nitrogen) supplied via conduits 34 and 35 to plenum 32 and/or deflecting surface 30 relative to wires 96 as discussed above. Upon completion of the transfer of thin film 42 to its target position, transfer table 16 may be returned to transfer drum 14 to receive the next thin film 42. This process may be repeated continuously or intermittently.

As noted above, the handling of thin films according to the present invention may be effected manually, automatically, or by a combination of the two. Appropriate automated controllers, for example, computerized controllers, may be used to optimize the translations, rotations, positioning, vacuums, gas pressures and flows, and related parameters of one or more of the components of the system shown in FIG. 1.

The invention described above and in the attached claims provides improved means for handling thin film materials, for example, during the insertion of thin film materials into assemblies containing thin film materials. In one aspect of the invention, thin film materials provided in sealed containers in corrosive environments are more readily manipulated to eliminate the need for human handling. In another aspect of the invention, the assembly of fuel-cell type membranes into fuel cell electrodes is automated and facilitated.

While the invention has been particularly shown and described with reference to preferred aspects and embodiments, it will be understood by those skilled in the art that various changes in form and details may be made to the invention without departing from the spirit and scope of the invention described in the following claims.

The invention claimed is:

1. A method for transferring a thin film from a source position to a target position, the method comprising:
   positioning the thin film in the source position;
   attaching the thin film to a first surface in a first position;
   moving the first surface from the first position to a second position wherein the thin film is removed from the source position;
   transferring the thin film from the first surface to a second surface, the second surface positioned in a first position;
   moving the second surface from the first position to a second position; and
   transferring the thin film from the second surface to the target position, and wherein the thin film comprises a fuel-cell membrane.

2. The method as recited in claim 1, wherein the fuel-cell membrane is provided in a viscous solution.

3. A method for feeding a fuel cell membrane to a fuel cell electrode, the method comprising:
   positioning the fuel cell membrane onto a vacuum table;
   attaching the fuel cell membrane to an arcuate surface in a first position;
   rotating the arcuate surface from the first position to a second position wherein the fuel cell membrane is removed from the vacuum table;
   transferring the fuel cell membrane from the arcuate surface to a transfer surface, the transfer surface positioned in a first position;
   moving the transfer surface having the fuel cell membrane from the first position to a second position adjacent a fuel cell electrode; and
   transferring the fuel cell membrane from the transfer surface to the fuel cell electrode.

* * * * *